UNITED STATES PATENT OFFICE.

GENNARO ROMANELLI, OF NEW YORK, N. Y.

BATTERY FLUID.

SPECIFICATION forming part of Letters Patent No. 658,900, dated October 2, 1900.

Application filed January 13, 1900. Serial No. 1,307. (No specimens.)

*To all whom it may concern:*

Be it known that I, GENNARO ROMANELLI, a subject of the King of Italy, residing at New York, in the county of New York and State of New York, have invented certain new and useful Improvements in Battery Elements or Fluids, of which the following is a full and complete specification, such as will enable those skilled in the art to which it appertains to make and use the same.

This invention relates to battery elements or fluids; and it has for its object to produce improved battery elements or fluids which will combine extreme inexpensiveness with the highest maximum of efficiency.

In carrying out my invention I employ cupric chlorid mixed with sulfate of sodium, the proportion of the sulfate of sodium being, say, about thirty per cent.

When the fluid is to be used for a gravity-cell, a solution of the cupric chlorid and sulfate of sodium is used for contact with the positive electrode and a solution of chlorid of sodium is used for contact with the negative electrode.

My invention consists, broadly, in a battery fluid in which cupric chlorid is the chief element; and it consists, specifically, in the mixed cupric chlorid and sulfate of sodium, as stated. This hybrid cupric chlorid, in combination with sulfate of sodium, is produced by mixing one part of sulfate of copper with two parts of chlorid of sodium ($CuSO_4 + 2NaCl$) and dissolving the same in boiling water, whereupon by reaction there is produced cupric chlorid and sulfate of sodium, ($CuCl_2 + Na_2SO_4$.) By exposing the resultant solution to a refrigerating action the sulfate of sodium will precipitate in crystals, which are then removed, and the remaining solution is evaporated or heated to dry out the water, and thus produce cupric chlorid ($CuCl_2$) in an amorphous mass.

I do not herein claim the process of thus producing cupric chlorid and sulfate of sodium, as above mentioned, the same forming the subject-matter of a separate application for Letters Patent, Serial No. 1,306, to which reference may be had for a more specific explanation of the various details of the process of producing the hybrid cupric chlorid mixed with the sulfate of sodium.

It will be understood that the cupric chlorid produced as above mentioned will remain mixed with about thirty per cent. of the sulfate of sodium, and therefore this cupric chlorid is produced in the proportion of, say, one and one-third parts, by weight, for every one part, by weight, of sulfate of copper used it being understood that the sulfate of copper and chlorid of sodium are first dissolved in equal proportions, by weight. The amorphous mass of cupric chlorid is split up into lumps for use as a battery element. This element is designed to form a much better battery fluid than the ordinary cupric sulfate now used for batteries, being adapted to have much less internal resistance and to impart a greater length of life to the battery. It is comparatively very inexpensive and is especially adapted for effective use in gravity batteries, inasmuch as cupric chlorid mixed with about thirty per cent. of sulfate of sodium is heavier than ordinary cupric chlorid or cupric sulfate and falls more readily to the bottom of the battery.

In the adaptation of my invention and improvements as a battery fluid I combine with one part, by weight, of chlorid of sodium in solution one-half to three-fourths of one part, by weight, of the hybrid cupric chlorid, the latter being in lumps, as above stated, so that it will fall to the bottom of the battery, and thus produce at the bottom of the cell in contact with the copper electrode (in gravity batteries) the cupric chlorid and sulfate of sodium, while above this, in contact with the zinc electrode, will exist the solution of chlorid of sodium.

I preferably combine with the solution of chlorid of sodium commercial acetic acid (vinegar) of low density (about five or six per cent.) in the proportion of about two-sixteenths or three-sixteenths of a part, by weight, to one part, by weight, of chlorid of sodium in solution, whereby the intensity of the battery will be increased.

It will of course be understood that the relative proportions as herein stated are only approximate and may be varied within certain degrees of required adaptation. For instance, the stated proportion of approximately thirty per cent. of sulfate of sodium, which will remain mixed with the cupric chlorid after the refrigeration, will considerably vary according to circumstances. The longer the period of refrigeration or the higher the degree of temperature employed in the refrigeration or the less water used will accordingly result in crystallizing out more of the sulfate of sodium, thus reducing its percentage with respect to the cupric chlorid, and, inversely, a larger percentage of the sulfate of sodium will remain mixed with the cupric chlorid.

Having fully described my invention, I claim as new and desire to secure by Letters Patent—

1. As an improved article of manufacture, a battery fluid consisting of cupric chlorid mixed with sulfate of sodium.

2. As an improved article of manufacture, a battery fluid consisting of cupric chlorid mixed with approximately thirty per cent. of sulfate of sodium.

3. A battery fluid consisting of cupric chlorid mixed with sulfate of sodium, combined with chlorid of sodium in solution, substantially as and for the purpose set forth.

4. A battery fluid consisting of one part by weight of chlorid of sodium in solution, and one-half to three-fourths of a part by weight of cupric chlorid mixed with sulfate of sodium in the proportion of about thirty per cent. of sulfate of sodium, substantially as and for the purpose set forth.

5. A battery fluid, consisting of chlorid of sodium combined in solution with acetic acid, and cupric chlorid mixed with sulfate of sodium, substantially as and for the purpose set forth.

6. A battery fluid, comprising a solution of cupric chlorid mixed with sulfate of sodium for contact with the negative electrode and a solution of chlorid of sodium for contact with the positive electrode.

In testimony that I claim the foregoing as my invention I have signed my name, in presence of the subscribing witnesses, this 9th day of January, 1900.

GENNARO ROMANELLI.

Witnesses:
F. A. STEWART,
V. M. VOSLER.